United States Patent
Hsiao et al.

(10) Patent No.: US 8,130,437 B2
(45) Date of Patent: Mar. 6, 2012

(54) COLOR FILTER AND COLOR REFLECTIVE DISPLAY DEVICE WITH THE SAME

(75) Inventors: Po-Wen Hsiao, Hsinchu (TW); Yuan-Chih Tasi, Hsinchu (TW); Lee-Tyng Chen, Hsinchu (TW); Chuan-Feng Liu, Hsinchu (TW); Ted-Hong Shinn, Hsinchu (TW)

(73) Assignee: E Ink Holding Inc., Hsinchu (TW)

( * ) Notice: Subject to any disclaimer, the term of this patent is extended or adjusted under 35 U.S.C. 154(b) by 48 days.

(21) Appl. No.: 12/509,479

(22) Filed: Jul. 26, 2009

(65) Prior Publication Data

US 2010/0284052 A1    Nov. 11, 2010

(30) Foreign Application Priority Data

May 8, 2009    (TW) ................................ 98115324 A

(51) Int. Cl.
*G02F 1/03* (2006.01)
(52) U.S. Cl. ........................ 359/259; 349/109
(58) Field of Classification Search .................. 359/259; 349/106
See application file for complete search history.

(56) References Cited

U.S. PATENT DOCUMENTS 7,209,198 B2   4/2007   Park et al.
2005/0117092 A1   6/2005   Park et al.
2006/0221092 A1*  10/2006  Noguchi et al. ............... 345/589
2009/0059135 A1*  3/2009   Park et al. ....................... 349/96

FOREIGN PATENT DOCUMENTS

CN    621917 A    6/2005
CN   1841469 A   10/2006

OTHER PUBLICATIONS

Office Action From China Patent Office.

* cited by examiner

*Primary Examiner* — Ricky Mack
*Assistant Examiner* — James Jones
(74) *Attorney, Agent, or Firm* — Chun-Ming Shih

(57) ABSTRACT

A color filter including a substrate, a plurality of pixel units and a transparent electrode layer is provided. The substrate has a plurality of pixel regions. Each pixel region has a plurality of first sub-pixel regions and a second sub-pixel region. Each pixel unit is disposed in one of the pixel regions corresponding thereto and includes a plurality of and a white filter film. Each color filter film is disposed in one of the first sub-pixel regions corresponding thereto and the white filter film is disposed in the second sub-pixel region. Since the area of the white filter film is larger than the area of each color filter film, the color filter has high light-transmittance. The transparent electrode layer is disposed on the pixel units. Furthermore, a color reflective display device with the color filter is disclosed.

19 Claims, 10 Drawing Sheets

COLOR FILTER AND COLOR REFLECTIVE DISPLAY DEVICE WITH THE SAME

BACKGROUND

This application claims priority to a Taiwan application No. 098115324 filed May 8, 2009.

1. Field of the Invention

The invention relates to a color filter, and more particular, to a color filter having property of high light-transmittance and a color reflective display device with the same.

2. Description of the Related Art

Since reflective display devices reflect incident light for displaying images, the back light module is unnecessary in the reflective display devices. Thus, the reflective display devices have properties of low power-consumption, light weight and thinness. Therefore, the reflective display devices get much attention in the display industry.

For the color reflective display device, a color filter is usually used to enable the reflective display device displaying color images. FIG. 1 is a diagram illustrating incident light of the color reflective display device in prior art. Referring to FIG. 1, the color reflective display device 100 includes a color filter 102, a display medium layer 104 and a reflective electrode array substrate 106. The light L is transmitted from the outside of the color reflective display device 100 to the display medium layer 104 through the color filter 102 and reflected by the reflective electrodes (not shown) of the reflective electrode array substrate 106. Then, the light transmits through the display medium layer 104 and the color filter 102 sequentially to human eyes 101. Thus, the human eyes 101 may watch colorful images displayed by the color reflective display device 100. However, since a part of energy of the light L would be absorbed by the color filter 102 before transmitted to the human eyes 101, the brightness of the color reflective display device 100 may be decreased.

FIG. 2 is a schematic view of a portion of the color filter in prior art. Referring to FIG. 2, the color filter 200 includes a substrate 202, a plurality of pixel units 204 and a transparent electrode layer (not shown) disposed on the pixel units 204. The pixel units 204 are disposed on the substrate 202.

As shown in FIG. 2, for increasing the brightness and saturation of the displayed images, the pixel units 204 of the color filter 200 used in the reflective display device not only include red filter films R, green filter films G and blue filter films B, also include white filter films W for increasing brightness. However, the light transmittance of the color filter 200 is increased by the white filter films W within limit.

BRIEF SUMMARY

The invention is directed to a color filter with high light-transmittance.

The invention is also directed to a color reflective display device with high displaying brightness.

The invention provides a color filter including a substrate, a plurality of pixel units and a transparent electrode layer. The substrate has a plurality of pixel regions. Each pixel region includes a plurality of first sub-pixel regions and a second sub-pixel region. The pixel units are respectively disposed in one of the pixel regions corresponded thereto. Each pixel unit includes a plurality of color filter films and a white filter film. For each pixel unit, the color filter films are respectively disposed in one of the first sub-pixel regions corresponded thereto. The white filter film is disposed in the second sub-pixel region. The area of the white filter film is larger than the area of each color filter film. The transparent electrode layer is disposed on the pixel units.

The invention also provides a color reflective display device including a reflective electrode array substrate, a display medium layer and the color filter. The color filter is disposed above the reflective electrode array substrate, and the display medium layer is disposed between the reflective electrode array substrate and the color filter.

As described in an embodiment of the invention, the area of each first sub-pixel region and the area of the second sub-pixel regions are the same for at least one of the pixel regions, and at least of the color filter films has at least an opening exploring a portion of the substrate.

As described in an embodiment of the invention, the opening is annular, such as circular-loop, polygonal-loop or irregular-loop.

As described in an embodiment of the invention, the area of each first sub-pixel region and the area of the second sub-pixel regions are the same for at least one of the pixel regions, and the color filter films respectively have a plurality of openings arranged in an array.

As described in an embodiment of the invention, the area of each first sub-pixel region and the area of the second sub-pixel regions are the same for at least one of the pixel regions, and the color filter films respectively have a plurality of openings interlaced to each other.

As described in an embodiment of the invention, the area of each first sub-pixel region and the area of the second sub-pixel regions are the same for at least one of the pixel regions, and the color filter films respectively have a plurality of openings with different shapes.

As described in an embodiment of the invention, the color filter further includes a transparent protecting layer. The area of each first sub-pixel region and the area of the second sub-pixel regions are the same for at least one of the pixel regions, and the transparent protecting layer is disposed in the first sub-pixel regions and surrounding the color filter films.

As described in an embodiment of the invention, the area of each first sub-pixel region is smaller than the area of the second sub-pixel region for at least one of the pixel regions.

In the color filter of the invention, since the area of the white filter film is larger than the area of each color filter film, the brightness of the light transmitting the color filter may be enhanced. Thus, the displaying brightness of the color reflective display device may be increased. Moreover, the color filter films of the color filter of the invention may be made with different areas for improving the chromatic recognizability of the color reflective display.

In order to make the aforementioned and other objects, features and advantages of the invention comprehensible, preferred embodiments accompanied with figures are described in detail below. It is to be understood that both the foregoing general description and the following detailed description are exemplary, and are intended to provide further explanation of this invention as claimed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

A reflective display device would be an example for describing the application of the color filter of the invention, but the invention is not limited hereto. The skilled person in the art should know that the color filter of the invention can also be used in other types of display device.

Figure 1:
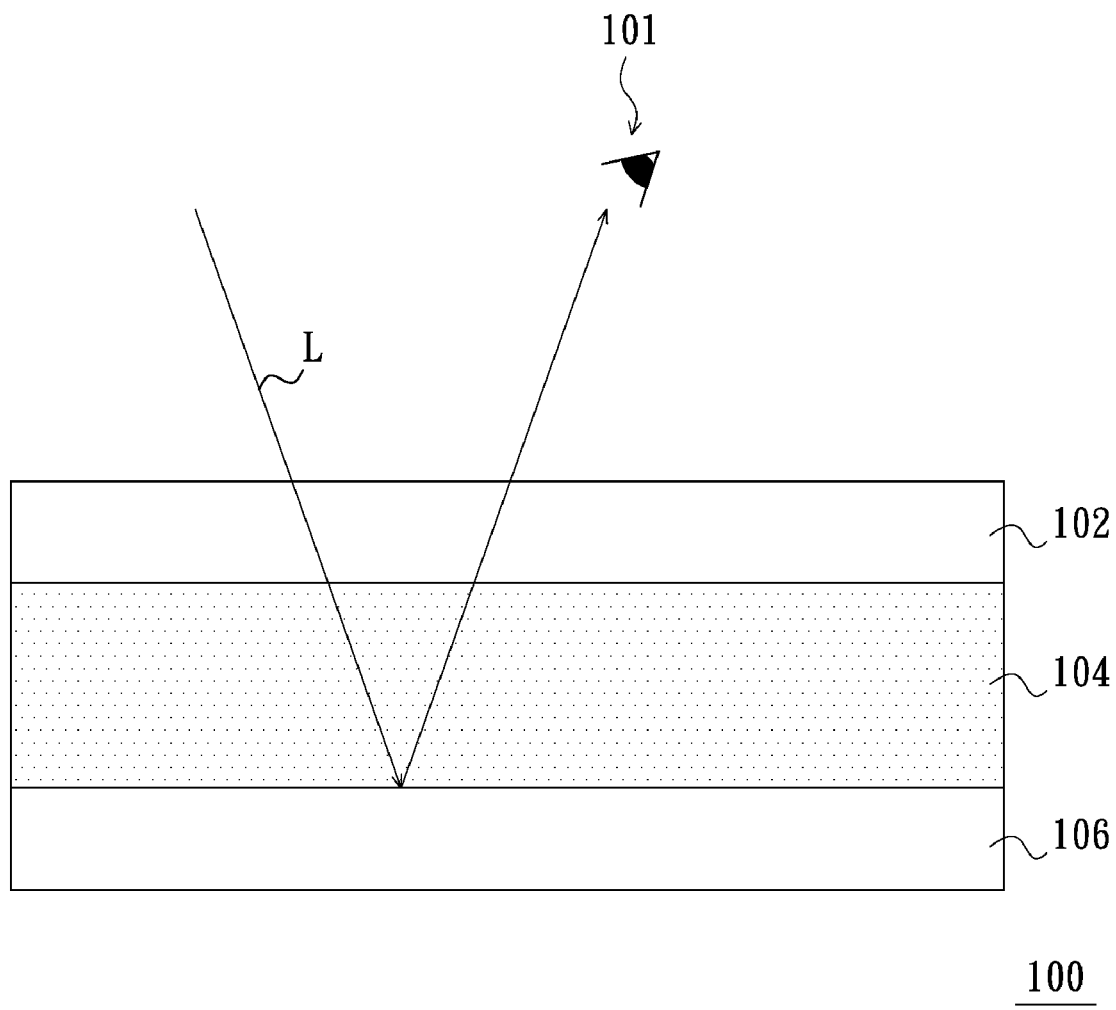
FIG. 1 is a diagram illustrating incident light of the color reflective display device in prior art.
Figure 2:
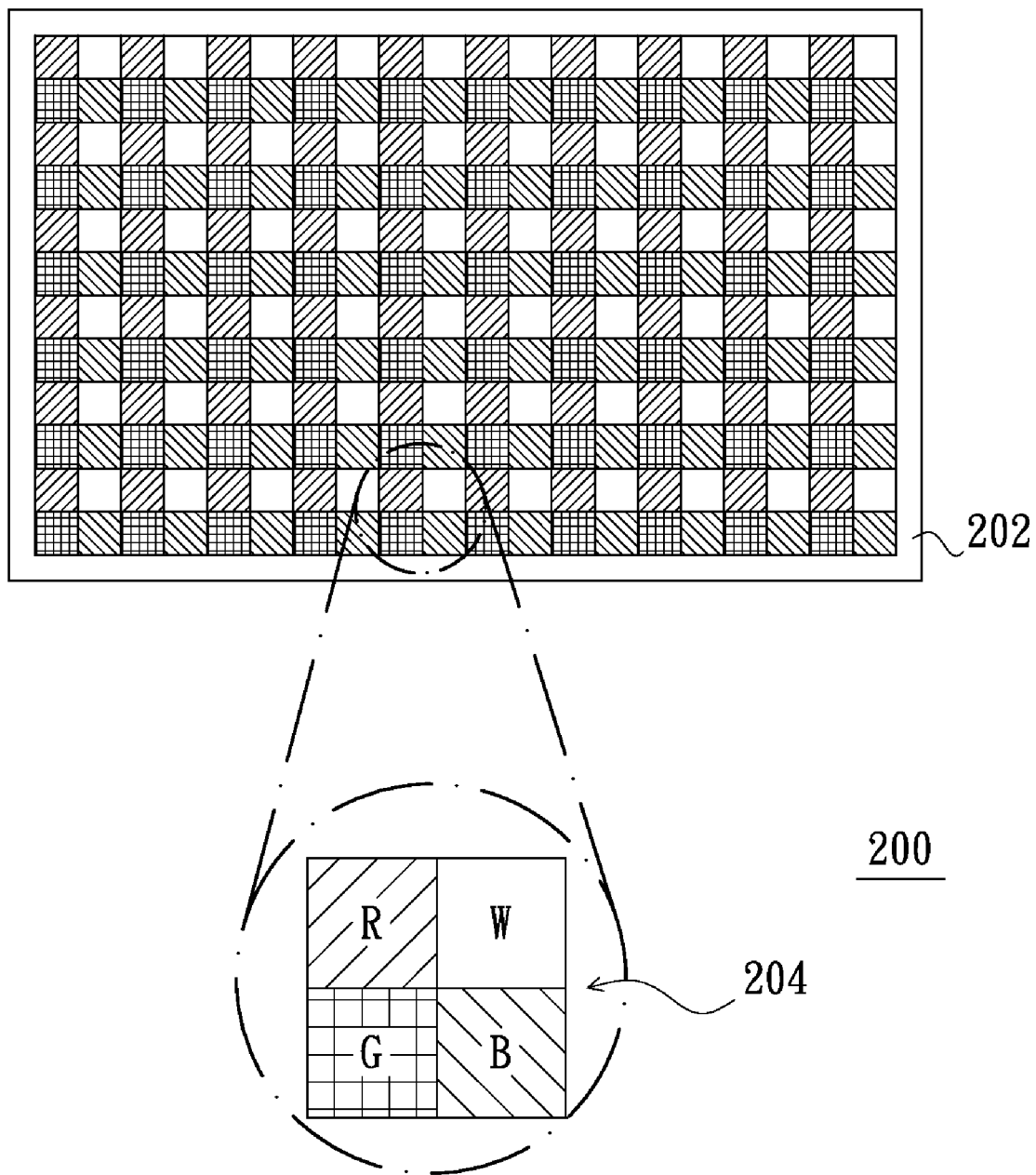
FIG. 2 is a schematic view of a portion of the color filter in prior art.
Figure 3:
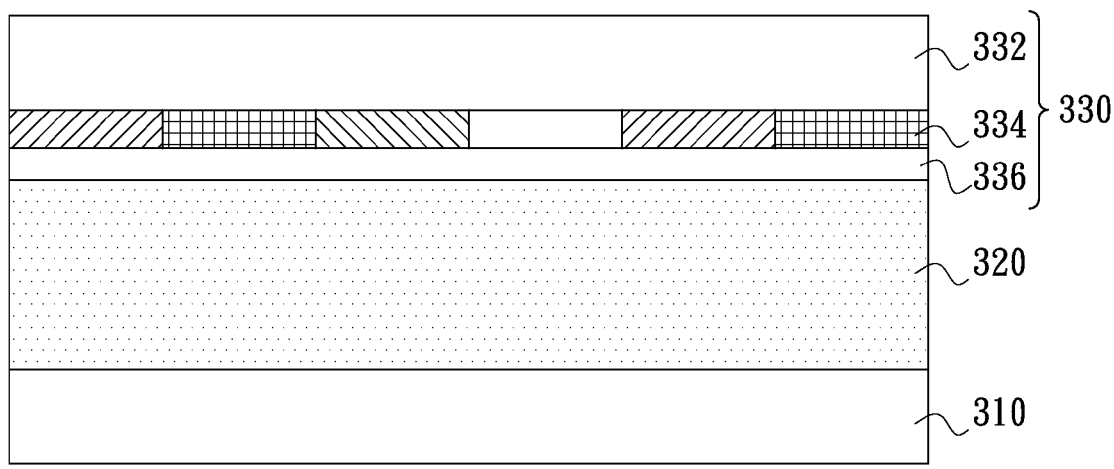
FIG. 3 is a cross-section view of a reflective display device in accordance with an embodiment of the invention.

FIG. 3 is a cross-section view of a reflective display device in accordance with an embodiment of the invention. Referring to FIG. 3, color reflective display device 300 includes a reflective electrode array substrate 310, a display medium layer 320 and a color filter 330. The reflective electrode array substrate 310 may include active elements or passive elements. For this embodiment, the reflective electrode array substrate 310 includes, for example, thin film transistors.

The color filter 330 is disposed above the reflective electrode array substrate 310 and includes a substrate 332, a plurality of pixel units 334 and a transparent electrode layer 336. Each pixel unit 334 includes a plurality of color filter films 335 and a white filter film W. For this embodiment, the color filter films 335 of each pixel unit 334 are red filter film, green filter film and blue filter film. An area of the white filter film W is larger than areas of the color filter films 335.

The display medium layer 320 is disposed between the reflective electrode array substrate 310 and the color filter 330 and may be a liquid crystal layer, an electrophoretic layer, an electro-wetting layer or an organic electro-luminescence layer.

The color filter of the invention would be expatiated in several embodiments, and the ways to make the area of the white filter film W is larger than the areas of the color filter films 335 also would be described, but the invention is not limited hereto.

Figure 4:
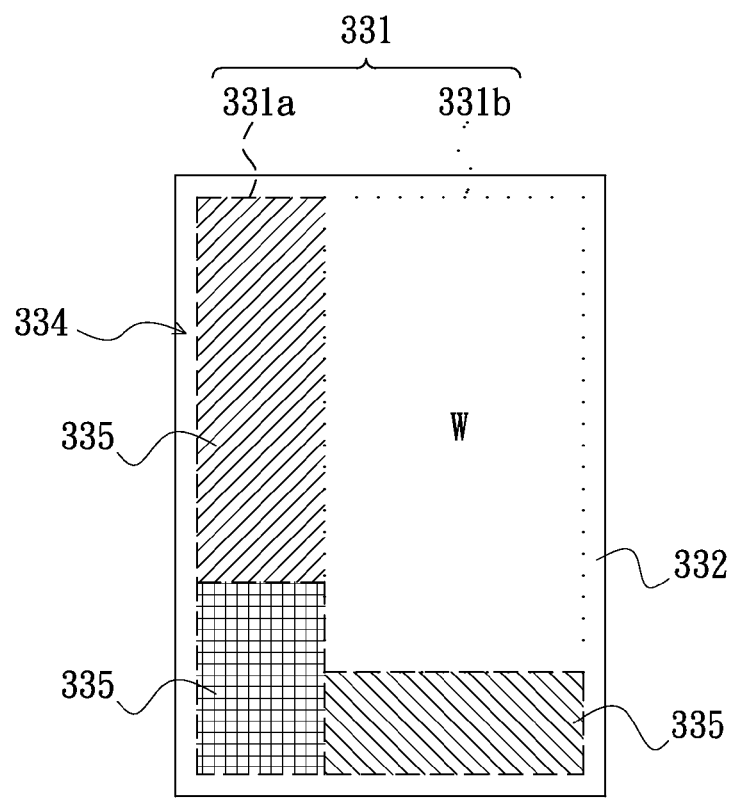
FIG. 4 is a schematic view of a color filter in accordance with an embodiment of the invention.

FIG. 4 is a schematic view of a color filter in accordance with an embodiment of the invention. Referring to FIG. 4, the substrate 332 has a plurality of pixel regions 331, and each pixel region 331 includes a plurality of first sub-pixel regions 331a and a second sub-pixel region 331b. For the convenience of description, there is only one of the pixel regions 331 be shown in FIG. 4.

Each pixel unit 334 is disposed in one of the pixel regions 331 corresponding thereto. Specifically, the color filter films 335 are respectively disposed in the corresponded first sub-pixel regions 331a and the white filter film W is disposed in the second sub-pixel region 331b. Furthermore, the first sub-pixel regions 331a and the second sub-pixel region 331b of this embodiment are arranged in, for example, a rectangular array, and the area of the second sub-pixel regions 331b is larger than the areas of the first sub-pixel regions 331a. Therefore, the area of the white filter film W disposed within the second sub-pixel region 331b is larger than the area of each color filter film 335 disposed within the first sub-pixel region 331a.

It should be noted that the areas of the first sub-pixel regions 331a of each pixel region 331 are not limited to be the same or different in the invention. For this embodiment, the areas of the first sub-pixel regions 331a of each pixel region 331 are different, so the areas of the color filter films 335 disposed therein are also different. In specific, the area of the red filter film R of each pixel unit 334 of this embodiment is larger than the areas of the green filter film G and the blue filter film B, but the invention is not limited hereto. In other embodiments of the invention, one of the color filter films 335 of each pixel unit 334 having the largest area may be the green filter film G or the blue filter film B.

Additionally, the arranged positions of the color filter films 335 and the white filter film W are not limited to the above-mentioned embodiments. The skilled person in the art can vary the arranged positions of the color filter films 335 and the white filter film W without transgressing the spirit of the invention, and the variations are within the scope of the invention.

Figure 5A:
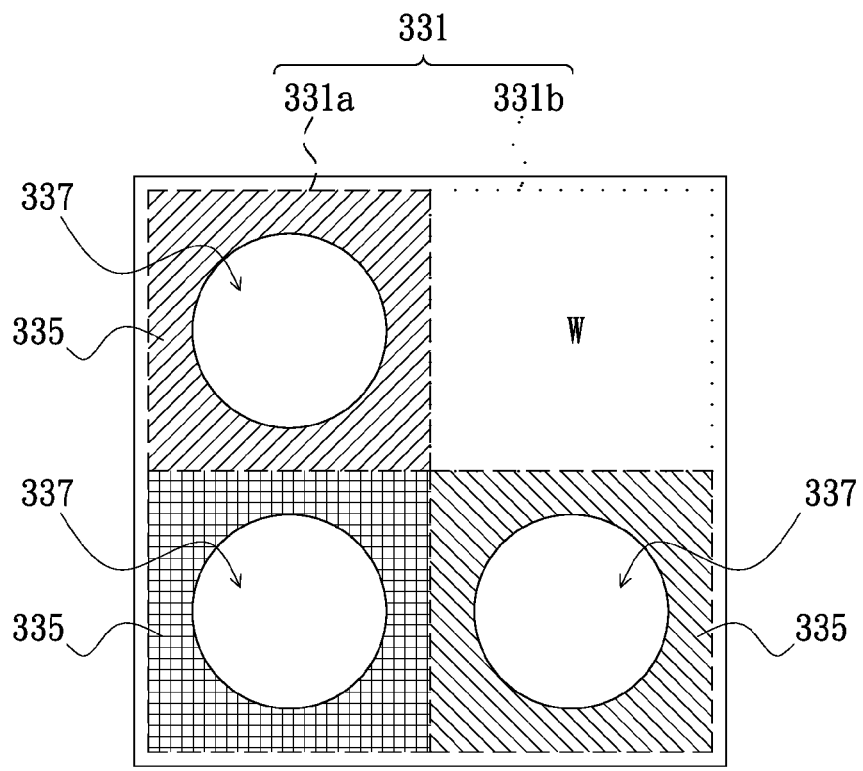
FIG. 5A to FIG. 5C are schematic views of the pixel unit of the color filter in accordance with other embodiment of the invention respectively.

FIG. 5A is a schematic view of the pixel unit of the color filter in accordance with another embodiment of the invention. Referring to FIG. 5A, in the pixel regions 331 of this embodiment, the first sub-pixel regions 331a and the second sub-pixel region 331b are arranged in an array and the area of the second sub-pixel regions 331b is equal to the area of each first sub-pixel region 331a. Specially, the color filter films 335 disposed within the first sub-pixel regions 331a respectively have an opening 337 exposing a portion of the substrate 332.

Figure 5B:
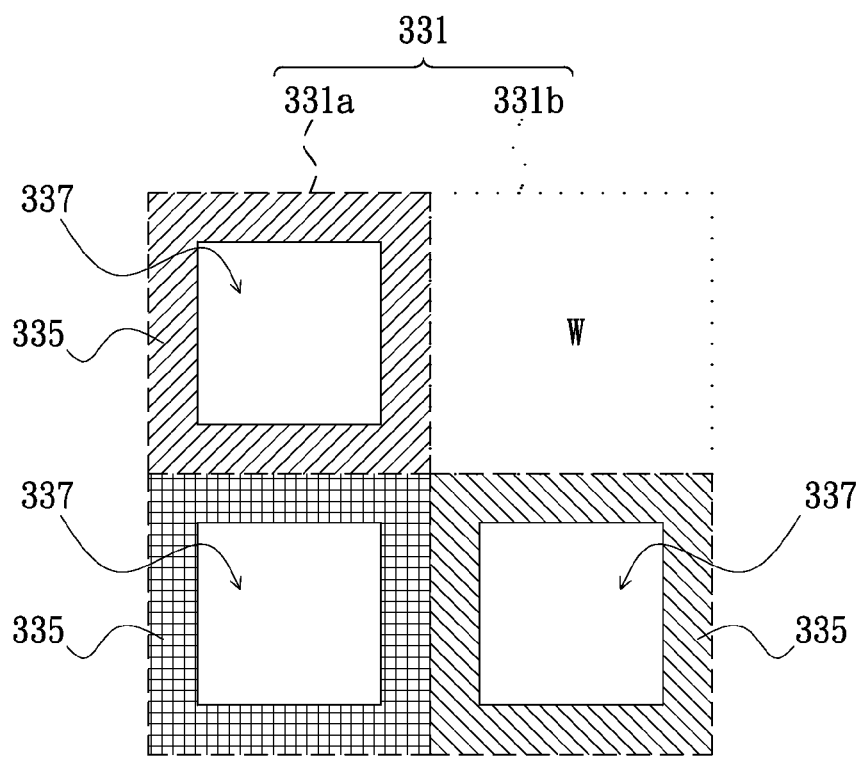
Figure 5C:
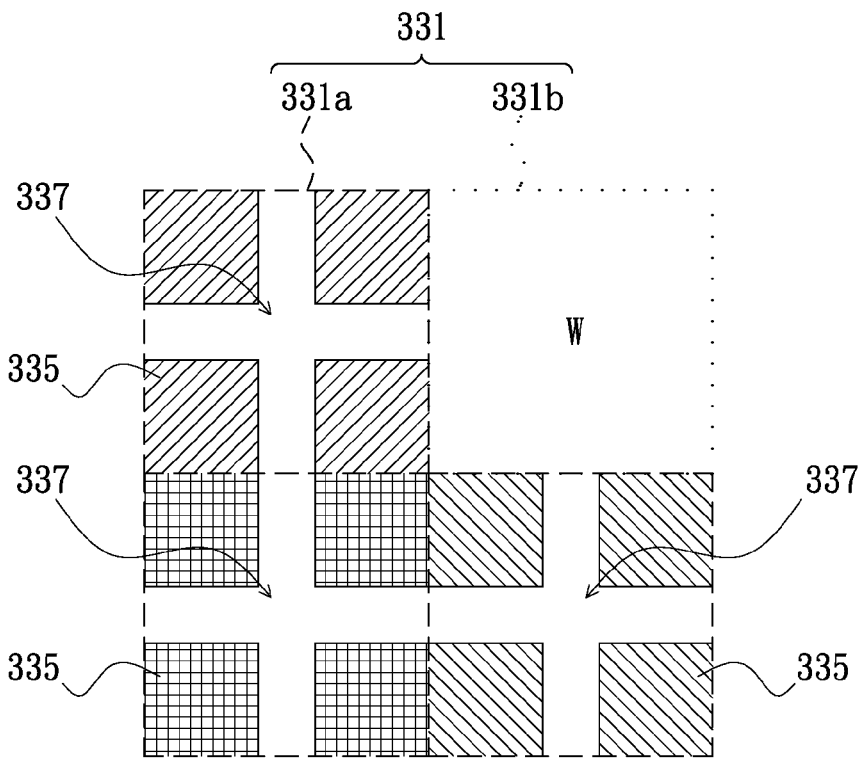

In specific, the opening 337 of each color filter film 335 of this embodiment is, for example, circular. Moreover, in other embodiments, the opening 337 of each color filter film 335 may be polygonal (as shown in FIG. 5B), crisscross (as shown in FIG. 5C) or irregular.

Figure 6A:
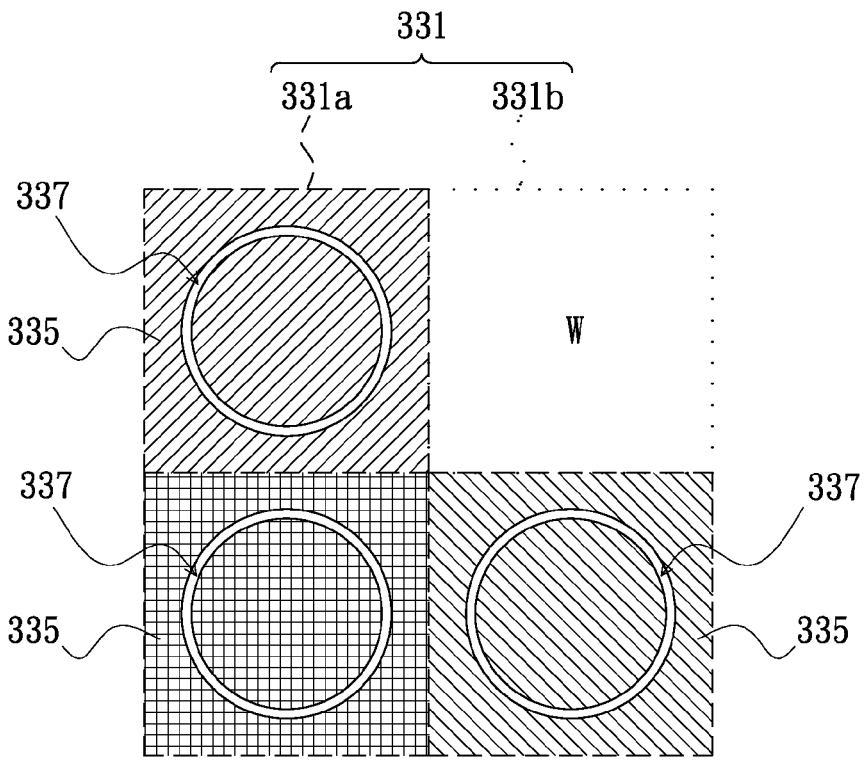
FIG. 6A to FIG. 6C are schematic views of the pixel unit of the color filter in accordance with other embodiment of the invention respectively.
Figure 6B:
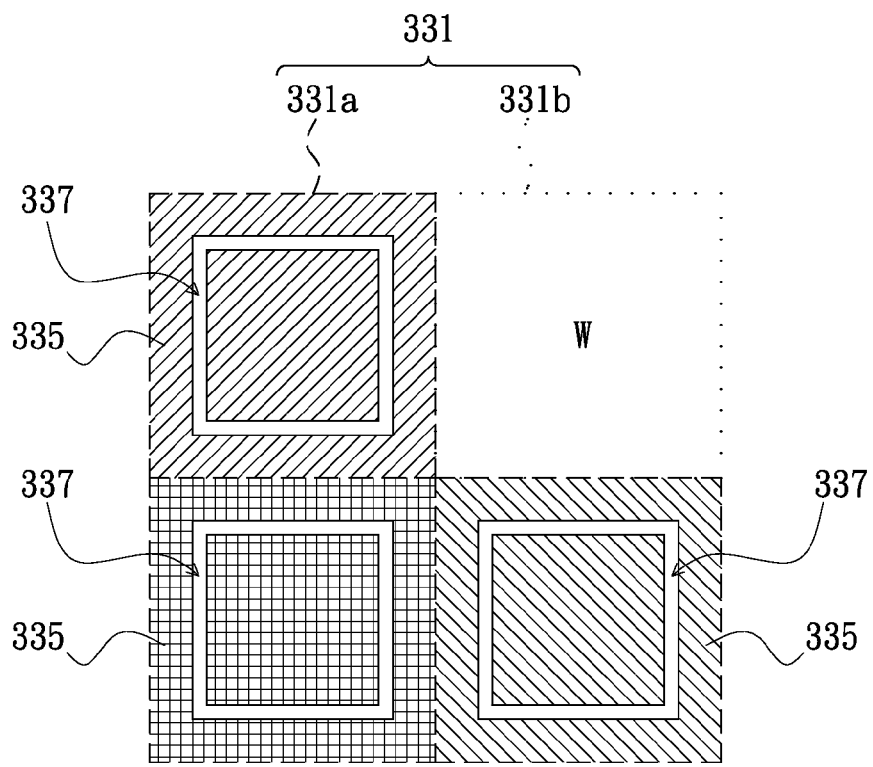
Figure 6C:
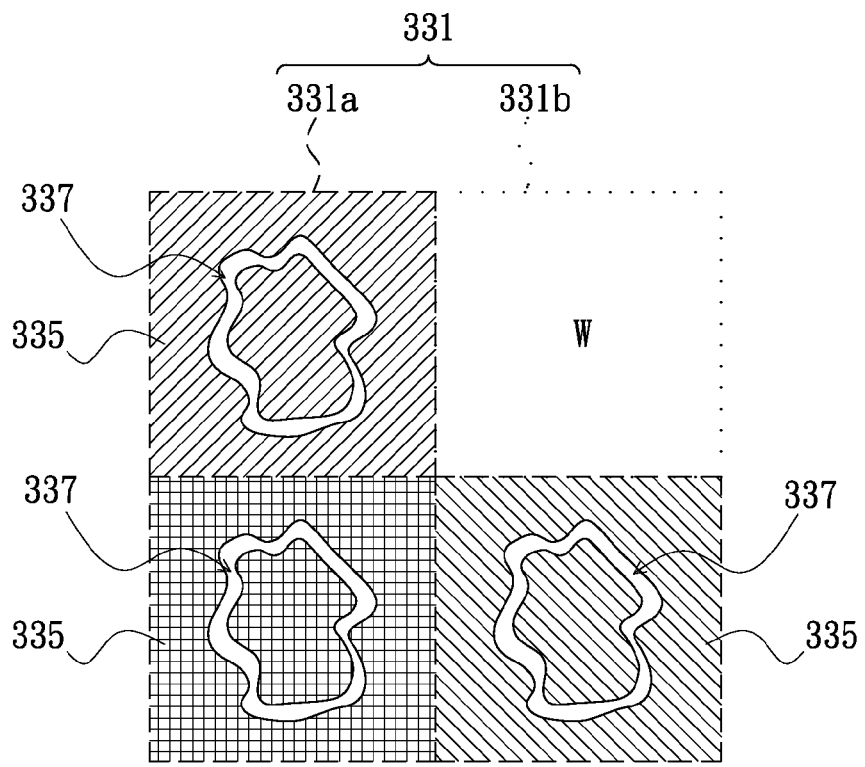

Furthermore, the opening 337 of each color filter film 335 may also be an annular opening, such as a circular annular opening (as shown in FIG. 6A), a polygonal annular opening (as shown in FIG. 6B) or an irregular annular opening (as shown in FIG. 6C), but the invention is not limited hereto.

In the invention, the amount of the openings formed in each color filter film is not limited. FIG. 7A to FIG. 7D are schematic views of the pixel unit of the color filter in accordance with other embodiments of the invention respectively. Referring to FIG. 7A to FIG. 7D, the first sub-pixel regions 331a and the second sub-pixel region 331b of this embodiment are arranged in an array. In each pixel region, the area of the second sub-pixel regions 331b is equal to the area of each first sub-pixel region 331a. Specially, the color filter films 435 disposed within the first sub-pixel regions 331a respectively have a plurality of opening 437. Moreover, the openings 437 of each color filter film 435 of this embodiment have the same shape. Also, in other embodiments of the invention, each color filter film 435 may have the openings 437 with different shapes, as shown in FIG. 8.

Figure 7A:
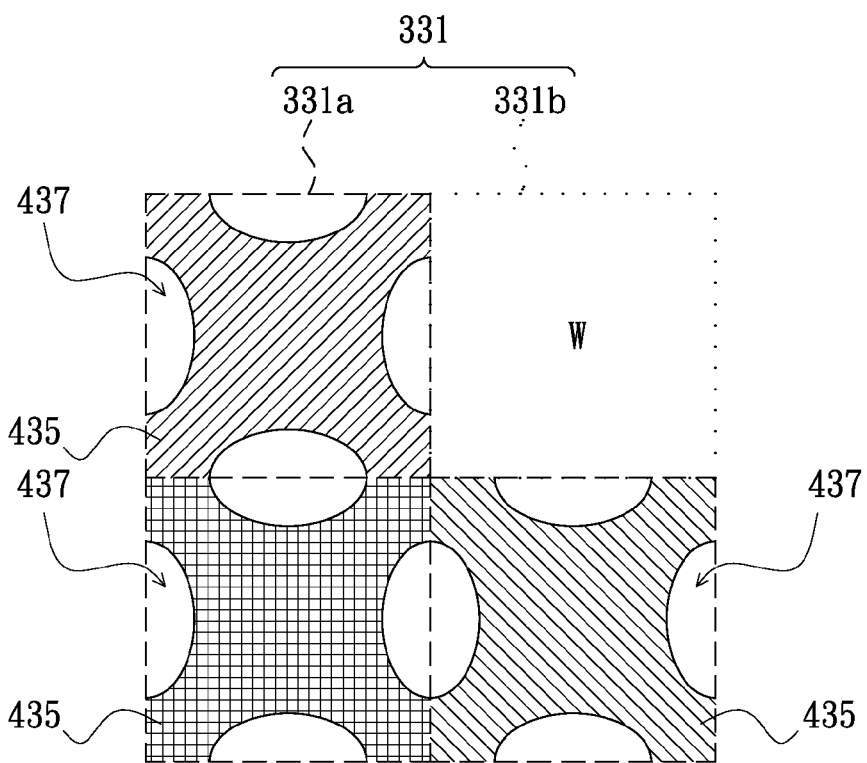
FIG. 7A to FIG. 7D are schematic views of the pixel unit of the color filter in accordance with other embodiments of the invention respectively.
Figure 7B:
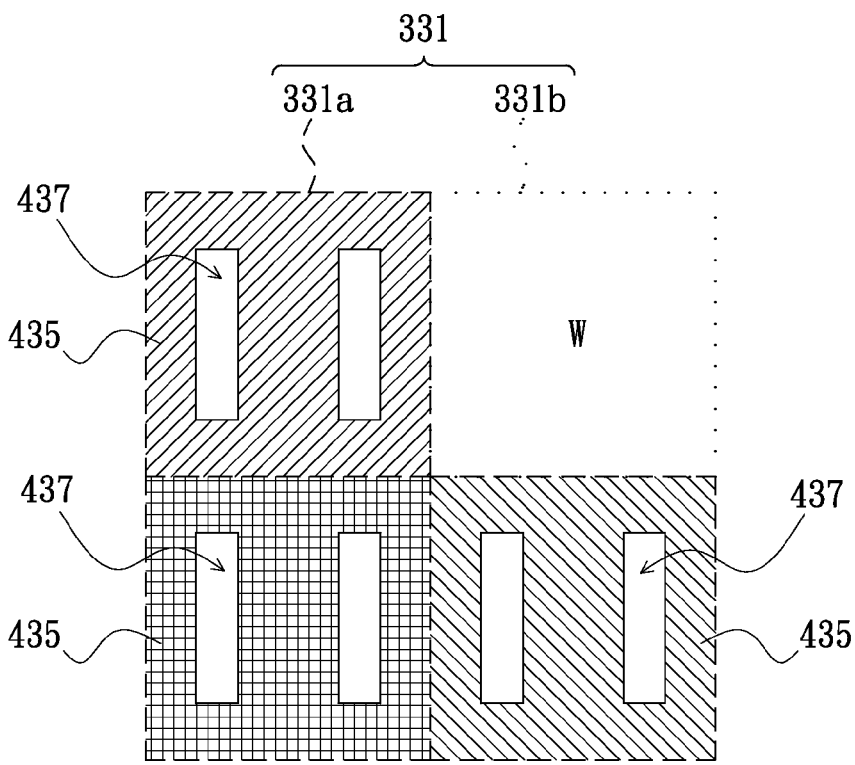
Figure 7C:
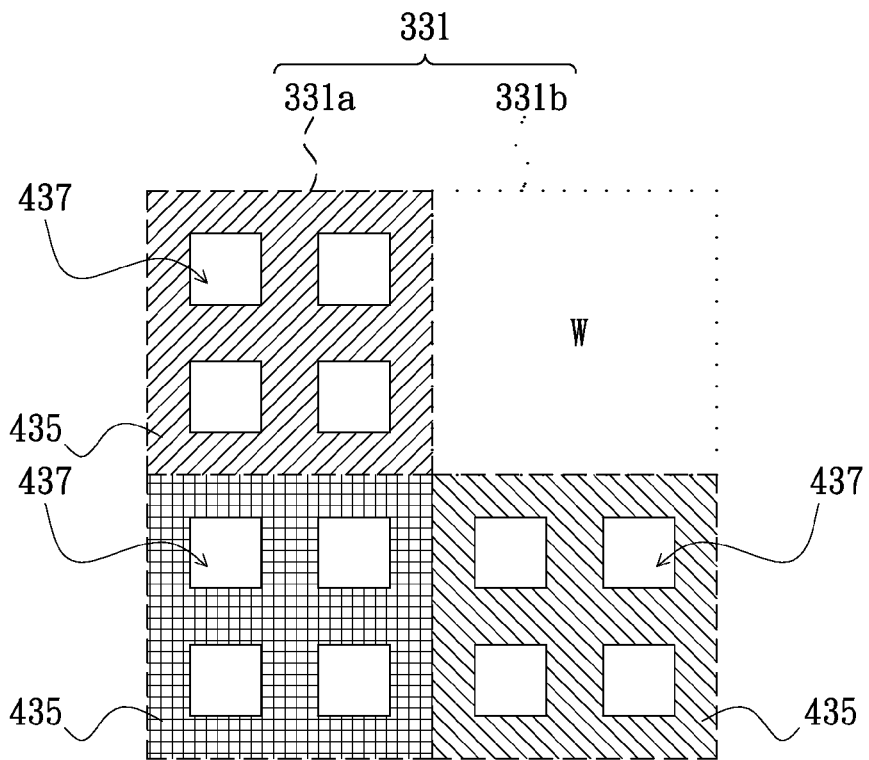
Figure 7D:
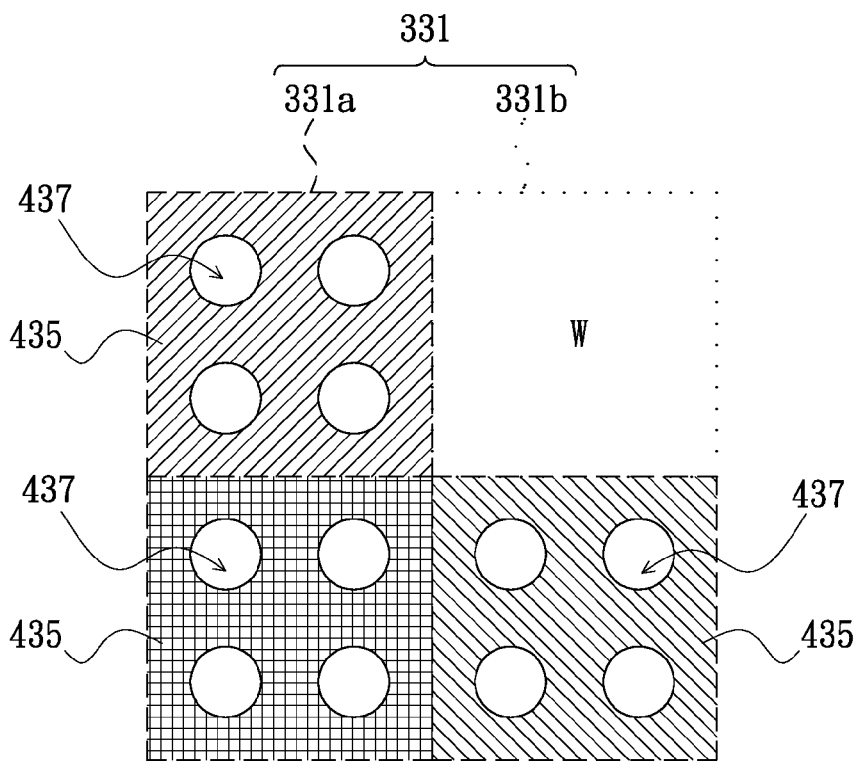
Figure 8:
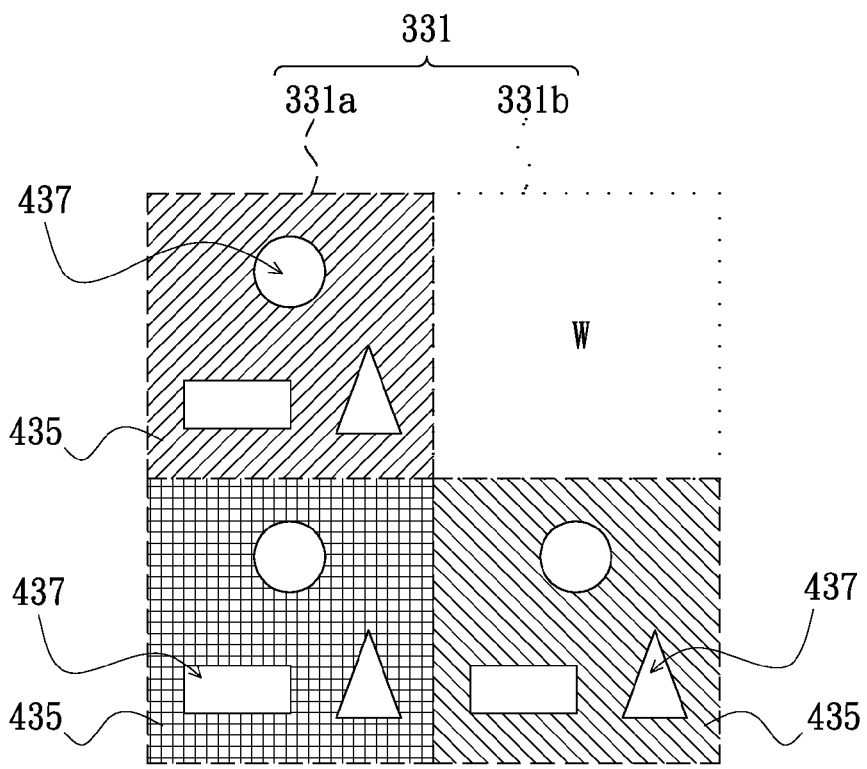
FIG. 8 is a schematic view of the pixel unit of the color filter in accordance with another embodiment of the invention.
Figure 9:
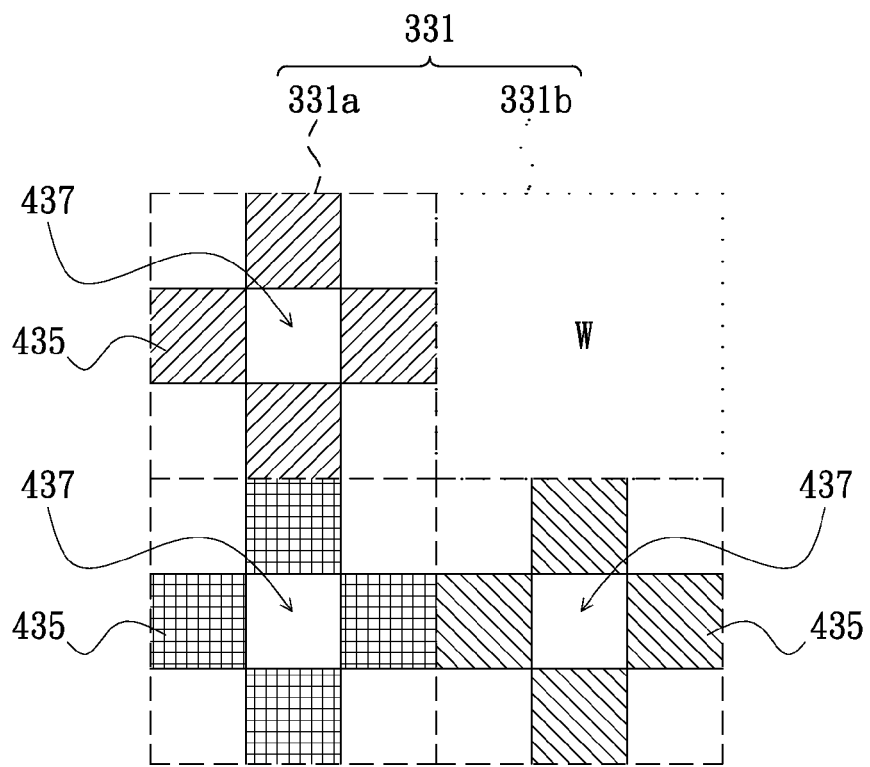
FIG. 9 is a schematic view of the pixel unit of the color filter in accordance with another embodiment of the invention.

Besides, the openings 437 are arranged in an array, as shown in FIG. 7B to FIG. 7D. In other embodiments of the invention, the openings 437 are interlaced to each other, as shown in FIG. 9. However, the invention is not limited hereto.

Figure 10:
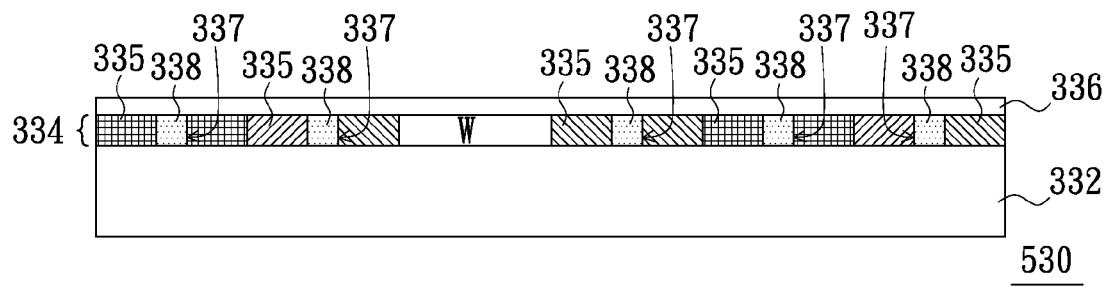
FIG. 10 is a cross-section view of the color filter in accordance with another embodiment of the invention.

FIG. 10 is a cross-section view of a color filter in accordance with another embodiment of the invention. Referring to FIG. 10, the color filter 530 includes not only the substrate 332, a plurality of pixel units 334 and the transparent electrode layer 336, also a transparent protecting layer 338 made of, for example, acrylic materials or epoxy resin. As the abovementioned, the color filter films 335 of each pixel unit 334 have at least an opening 337 respectively, an the transparent protecting layer 338 is filled into the openings 337 to uniform the thickness of the color filter 530. Therefore, the uniformity of intensity of the light transmitting through the color filter 530 may be increased.

Figure 11A:
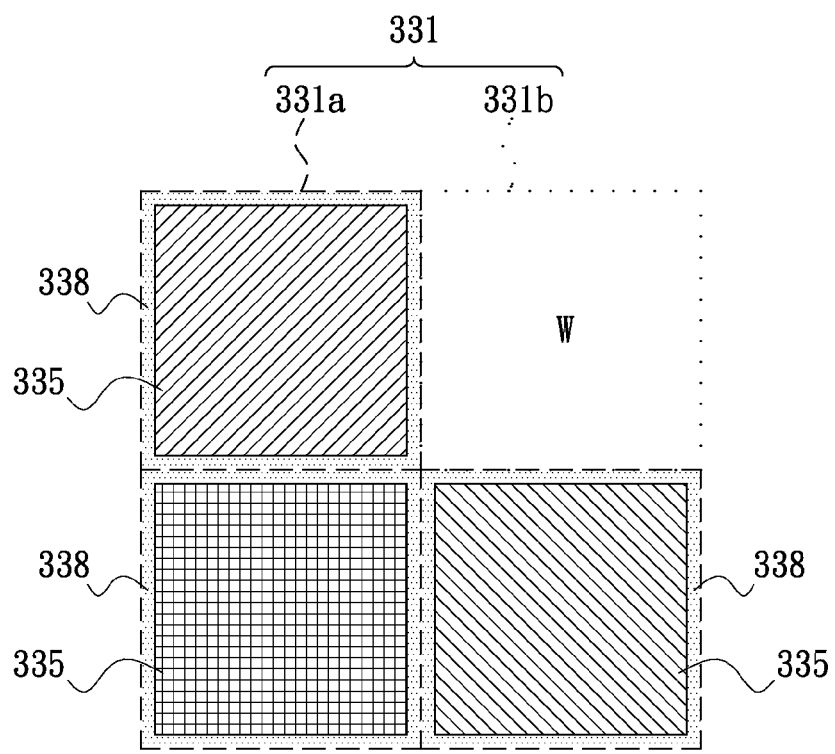
FIG. 11A is a schematic view of a color filter in accordance with another embodiment of the invention.
Figure 11B:
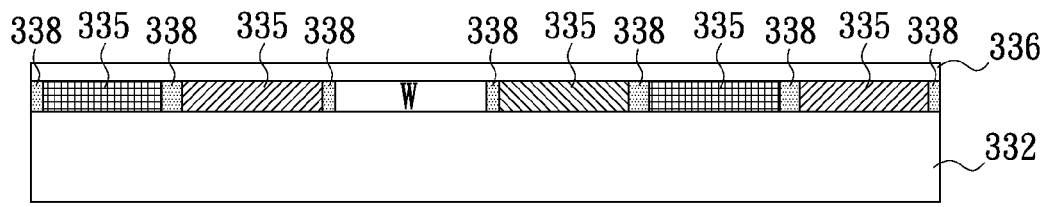
FIG. 11B is a cross-section view of the color filter shown in FIG. 11A.

In another embodiment of the invention, the transparent protecting layer 338 is disposed in the first sub-pixel regions 331*a* and surrounding the color filter films 335, as shown in FIG. 11A and FIG. 11B. In detail, in each pixel region 331 of this embodiment, the area of each first sub-pixel region 331*a* is equal to the area of the second sub-pixel regions 331*b*, the white filter film W is the formed in full second sub-pixel region 331*b*, and the color filter film 335 and the transparent protecting layer 338 surrounding thereto are formed in each first sub-pixel region 331*a*. Therefore, the area of each color filter film 335 is smaller than the area of the white filter film W.

It should be noted that the abovementioned embodiments are exemplary, the skilled person in the art can properly combine these embodiments without transgressing the spirit of the invention, and the combination is also within the scope of the invention.

In summary, since the area of the white filter film is larger than the area of the color filter film in the color filter of the invention, the intensity of light transmitting through the color filter may be enhanced and the brightness of the color reflective display device may be increased. Furthermore, since the areas of the color filter films of the color filter of the invention can be different from each other, the chromatic recognizability of color reflective display device may be improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A color filter, comprising:
a substrate having a plurality of pixel regions, each of the pixel regions comprising a plurality of first sub-pixel regions and a second sub-pixel region, wherein the area of each of the first sub-pixel regions and the area of the second sub-pixel regions are the same in at least one of the pixel regions;
a plurality of pixel units, disposed in the pixel regions respectively, wherein each of the pixel units comprises a plurality of color filter films disposed in the first sub-pixel regions corresponded thereto respectively and a white filter film disposed in the second sub-pixel region, and at least one of the color filter films has at least one opening exploring a portion of the substrate;
a transparent protecting layer, disposed in the at least one opening; and
a transparent electrode layer, disposed on the pixel units.

2. A color reflective display device, comprising:
a reflective electrode array substrate;
a color filter, disposed above the reflective electrode array substrate and comprising:
a substrate having a plurality of pixel regions, each of the pixel regions comprising a plurality of first sub-pixel regions and a second sub-pixel region, wherein the area of each of the first sub-pixel regions and the area of the second sub-pixel region are the same in at least one of the pixel regions;
a plurality of pixel units, disposed in the pixel regions respectively, wherein each of the pixel units comprises a plurality of color filter films disposed in the first sub-pixel regions corresponded thereto respectively and a white filter film disposed in the second sub-pixel region, and at least one of the color filter films has at least one opening exploring a portion of the substrate;
a transparent protecting layer, disposed in the at least one opening; and
a transparent electrode layer, disposed on the pixel units; and
a display medium layer, disposed between the reflective electrode array substrate and the color filter.

3. A color filter, comprising:
a substrate, having a plurality of pixel regions, wherein each of the pixel regions comprises a plurality of first sub-pixel regions and a second sub-pixel region;
a plurality of pixel units, disposed in the pixel regions respectively, wherein each of the pixel units comprises a plurality of color filter films respectively disposed in the first sub-pixel regions and a white filter film disposed in the second sub-pixel region, and at least one of the color filter films has at least one opening exploring a portion of the substrate; and
at least one transparent protecting layer, disposed in the at least one opening.

4. The color filter as recited in claim 3, wherein the at least one opening is annular.

5. The color filter as recited in claim 3, wherein the at least one opening is circular, polygonal or irregular.

6. The color filter as recited in claim 3, wherein at least one of the color filter films has a plurality of openings.

7. The color filter as recited in claim 6, wherein the openings are arranged in an array.

8. The color filter as recited in claim 6, wherein the openings are interlaced to each other.

9. The color filter as recited in claim 6, wherein the openings have different shapes.

10. The color filter as recited in claim 3, wherein the area of the white filter film is lager than the area of each of the color filter films.

11. The color filter as recited in claim 3, wherein the color filter films and the white filter film are arranged in an array.

12. The color filter as recited in claim 3, wherein the first sub-pixel regions each have different areas in one of the pixel regions.

13. The color filter as recited in claim 3, wherein the at least one transparent protecting layer is disposed in the first sub-pixel regions and surrounding the color filter films.

14. The color filter as recited in claim 3, further comprising a transparent electrode layer disposed on the pixel units.

15. A color filter, comprising:
- a substrate, having a plurality of pixel regions, each of the pixel regions comprising a plurality of first sub-pixel regions and a second sub-pixel region, the area of each of the first sub-pixel regions and the area of the second sub-pixel region are the same in one of the pixel regions;
- a plurality of pixel units, disposed in the pixel regions respectively, wherein each of the pixel units comprises a plurality of color filter films respectively disposed in the first sub-pixel regions and a white filter film disposed in the second sub-pixel region; and
- at least one transparent protecting layer disposed in the first sub-pixel regions and surrounding the color filter films.

16. The color filter as recited in claim 15, further comprising a transparent electrode layer disposed on the pixel units.

17. The color filter as recited in claim 15, wherein at least one of the color filter films has a plurality of the openings.

18. The color filter as recited in claim 17, wherein the openings have different shapes.

19. A color reflective display device, comprising:
- a reflective electrode array substrate;
- a color filter, disposed above the reflective electrode array substrate and comprising:
  - a substrate, having a plurality of pixel regions, wherein each of the pixel regions comprises a plurality of first sub-pixel regions and a second sub-pixel region;
  - a plurality of pixel units, disposed in the pixel regions respectively, wherein each of the pixel units comprises a plurality of color filter films respectively disposed in the first sub-pixel regions and a white filter film disposed in the second sub-pixel region, and at least one of the color filter films has at least one opening exploring a portion of the substrate; and
  - at least one transparent protecting layer, disposed in the opening; and
- a display medium layer, disposed between the reflective electrode array substrate and the color filter.

* * * * *